US005671869A

United States Patent [19]

Althouse et al.

[11] Patent Number: 5,671,869

[45] Date of Patent: Sep. 30, 1997

[54] FIBER CHAFF DISSEMINATOR

[75] Inventors: Mark L. G. Althouse, Bel Air, Md.; Kevin J. Wilcock, Tooele, Utah

[73] Assignee: The United States of America as represented by the Secretary of the Army, Washington, D.C.

[21] Appl. No.: 566,742

[22] Filed: Dec. 4, 1995

[51] Int. Cl.$^6$ ....... G01F 11/00

[52] U.S. Cl. ....... 222/1; 222/195; 222/637; 244/136; 406/98; 406/102

[58] Field of Search ....... 222/1, 195, 386, 222/394, 399, 630, 637; 406/39, 98, 136, 137, 138, 102; 244/136

[56] References Cited

U.S. PATENT DOCUMENTS

| | | | |
|---|---|---|---|
| 3,777,978 | 12/1973 | Manicatide et al. | 244/136 X |
| 4,345,702 | 8/1982 | Wolfe | 222/630 |
| 4,382,568 | 5/1983 | Schertz | 244/136 |
| 5,096,096 | 3/1992 | Calaunan | 222/195 |
| 5,226,567 | 7/1993 | Sansalone | 222/195 |
| 5,507,602 | 4/1996 | Walker | 222/195 X |

FOREIGN PATENT DOCUMENTS

| | | | |
|---|---|---|---|
| 120420 | 2/1968 | Norway | 406/138 |

*Primary Examiner*—Joseph Kaufman

*Attorney, Agent, or Firm*—Ulysses John Biffoni; Edward L. Stolarun

[57] ABSTRACT

A chaff disseminator for uniformly distributing short fibers into the air for disrupt enemy radar tracking in an air combat situation. Such fibers are typically 3 to 25 microns in diameter and cut to ⅛ to ½ inch in length. Fiber concentration and output are regulated by changing the air flow direction in a hopper while keeping the total air flow volume constant. A load of fibers in the hopper is raised by an upward airflow causing the load to tumble and reducing the packing density of the fibers at the edge of the load. The reduced packing density permits lower speed horizontal airflows to pull off fibers for dissemination. A fluid bed is created depending by a series of small holes drilled in the bottom of the hopper, by regulation of the airflow along the lid of the hopper and by air jets mounted along the bottom front edge of the hopper. A baffle which the load compressed and directs the cross load airflow.

20 Claims, 2 Drawing Sheets

FIBER CHAFF DISSEMINATOR

BACKGROUND OF THE INVENTION

1. Field of the Invention

This invention relates to chaff disseminating devices or more particularly to disseminators of chaff in fiber form.

2. Description of the Prior Art

In a combat situation, it is frequently desired to disrupt radar tracking of aircraft. This is often done by distributing airborne metallic chaff materials from an airplane. Chaff is produced in the form of short fibers which are typically 3 to 25 microns in diameter and cut to ⅛ to ½ inch in length. It has been a problem in the art to provide an effective means of uniformly disseminating short fiber chaff into the air.

While it is well known in the art to spread materials across a wide span, typical machinery is only suitable for spreading powders and liquids. In this regard, OMA, Macchine Agricole, Bologna, Italy manufactures a sprayer which is useful for spraying powders and liquids for agricultural purposes. However, such machines are not particularly useful for spreading fibers due to an inability to regulate the concentration and flow rate of the fibers leading to clogging of the squirrel cage portion of a blower. Prior art designs direct an airstream across the top of a powder load in a hopper where the turbulent flow picks up powder from the load surface. The airstream crossing the powder load can be regulated to adjust the density of output. However fibers, because of their cylindrical shape, adhere to each other much more strongly than powder particles, thus an airstream can only dislodge fibers from the load at the full flow rate. The net operational result is either high density dissemination or no dissemination. To remedy this, the present invention regulates fiber concentration and output by changing the air flow direction in a hopper while keeping the total air flow volume essentially constant. A load of fibers in a hopper is raised by an upward airflow. Once raised, the load is caused to tumble and the packing density of the fibers at the edge of the load is reduced. The reduced packing density permits lower speed horizontal airflows to pull off fibers for dissemination.

A combination of methods is used to create a fluid bed depending upon the properties of the fiber load. A first method uses a series of small holes drilled in the bottom of the hopper. By regulating the airflow through these holes the load can be lifted. A corresponding regulation of the airflow along the lid of the hopper maintains a steady pressure on the blower. When the blower pressure drop is insufficient to raise the fiber load via the bottom holes, such as when the load is large or the fibers heavy, additional airflow can be introduced by air jets mounted along the bottom front edge of the hopper. Air coming from these jets reduces the draw for clean air and does not reverse the flow direction in the hopper because of the presence of a baffle which keeps the load compressed and directs the cross load airflow. The compressed air flow is regulated so as not to exceed the blower flow volume minus a minimum flow across the load. These additional airflow routes work together to achieve good tumbling of the load. Since the flow through the holes in a hopper bottom is distributed, it serves to lift the load. An additional high velocity but low volume flow from the jets ensures tumbling.

SUMMARY OF THE INVENTION

The invention provides a fiber chaff dispenser which comprises:

a.) a hopper capable of containing a mass of fiber chaff, the hopper comprising a single, continuous bottom and rear wall member whose cross section is an arc of a circle, and a front panel and two side panels attached to the bottom and rear wall member to form a substantially enclosed vessel having an open top; at least the bottom portion of the bottom and rear wall member having a plurality of airholes therethrough; the front panel having a single exit port for the fiber chaff;

b.) a lid, hingedly attached to the two side panels and extending a distance sufficient to substantially completely cover the open top;

c.) adjustable cam means attached to at least one of the two side panels, capable of lifting the lid a distance above the open top to thereby provide an airflow ingress to the hopper;

d.) a dispensing chamber comprising a wall interior to the hopper spaced from and substantially parallel to the plane of the front panel, said chamber extending from the bottom of the exit port and extending to a point below the hopper top;

e.) baffle means, attached at a hinge to each of the two side panels inside the hopper spaced a distance behind the dispensing chamber, the baffle spanning the width of the hopper between each of the two side panels and extending the distance to the bottom and rear wall member;

f.) an airflow control channel extending along the curvature of the bottom and rear wall member and positioned over the airholes at the bottom portion thereof, said channel providing means to adjust the amount of air flow through said airholes;

g.) a plurality of airjets extending through the bottom portion of the bottom and rear wall member behind the dispensing chamber, said airjets being capable of directing a supply of forced air therethrough into the hopper; and h.) blower means attached to the exit port and capable of receiving fiber chaff from the dispensing chamber and blowing said chaff out through a chute.

The invention is also directed to a method of dispensing fiber chaff which comprises providing the above chaff dispenser; causing air to flow into the hopper from at least one of the airflow ingress, the plurality of airholes and the airjets, such that the air flow is sufficient to continuously lift fiber chaff in the hopper and supplying the chaff to the blower; and then causing the blower to acquire the chaff from the hopper and expel the chaff out through a chute.

It is therefore an object of this invention to provide an improved device to disseminate chaff in fiber form.

DETAILED DESCRIPTION OF THE PREFERRED EMBODIMENT

Figure 1:
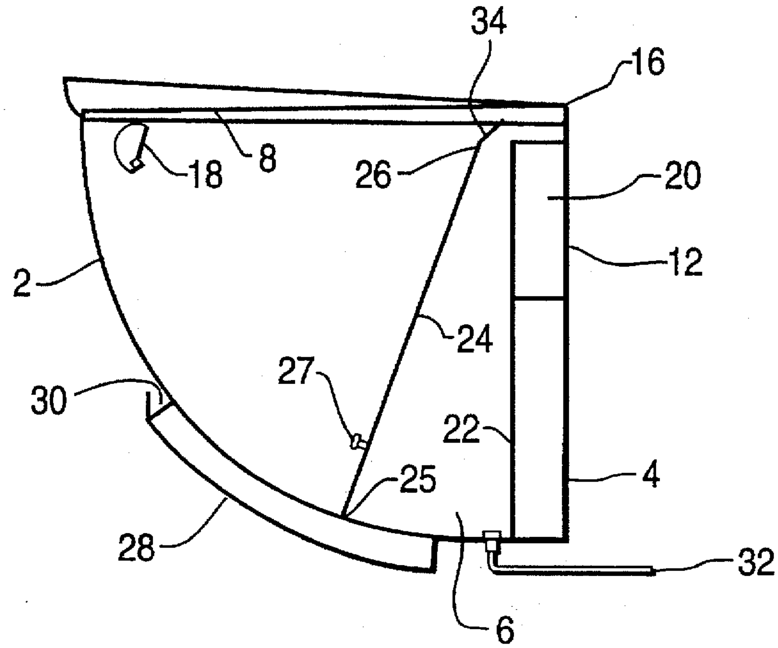
FIG. 1 shows a side, partial cutaway view of the hopper portion of the chaff disseminator according to the invention.
Figure 2:
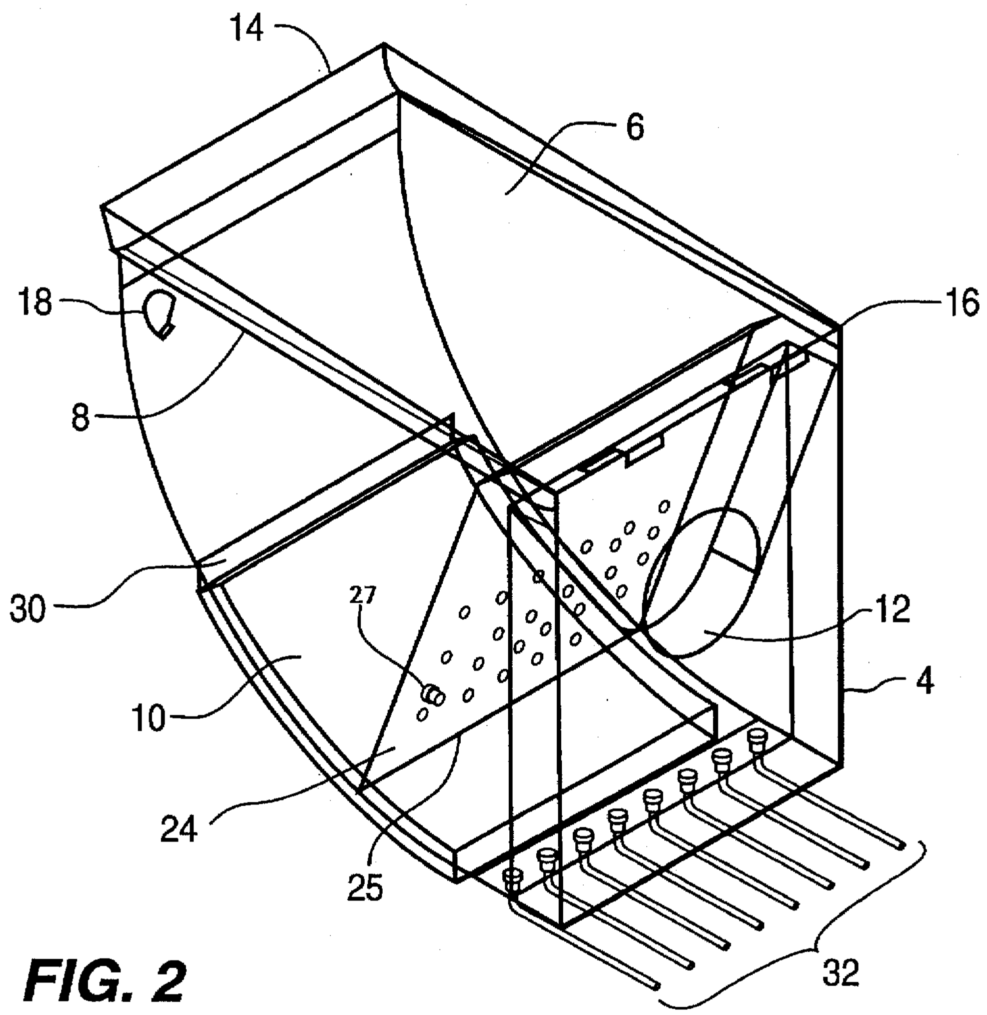
FIG. 2 shows a side perspective, partial cutaway view of the hopper portion of the chaff disseminator according to the invention.

Referring to FIGS. 1 and 2, there is shown a side cross sectional view of the hopper portion of the chaff disseminator according to the invention. The hopper comprises a single, continuous bottom and rear wall member 2 whose cross section is an arc of a circle. It has a front panel 4 and two opposite side panels 6 attached to the bottom and rear wall member to form a substantially enclosed vessel having an open top 8. The bottom portion of the bottom and rear wall member has a plurality of airholes 10 therethrough. Typically, the bottom has from about 500 to about 800 one-eighth inch holes spaced along from about a 12 inch to about a twenty inch square area of the hopper bottom.

The front panel 4 has a single exit port 12 for dispersing the fiber chaff therethrough. Over the hopper is a lid 14, attached to the two side panels 6 by hinges at point 16. The lid extends a distance sufficient to substantially completely cover the open top 8. Attached to at least one of the side panels is an adjustable cam 18 which is capable of lifting the lid 14 above the open top 8 to allow a controlled airflow into the hopper. Typically, the lid is lifted from about 1 to about 4 inches. Inside of the hopper is a dispensing chamber 20 which comprises a wall 22 in the hopper which is spaced from and substantially parallel to the plane of the front panel 4. The chamber 20 extends from the bottom of the exit port 12 and extends at an angle to a point below the hopper top as shown. The portion below the chamber 20 is unused solid or dead space. Also inside the hopper is a baffle 24, attached at a hinge 26 to each of the two side panels inside the hopper and positioned a distance behind the dispensing chamber wall 22. The baffle serves to compress the chaff load. Baffle 24 spans the width of the hopper between each of the two side panels 6 and extends to the bottom and rear wall member 2. Baffle 24 has a plurality of airholes therethrough and a rubber edge 25 at a point of contact with the bottom and rear wall member. Baffle 24 also preferably has a handle 27 allowing manual lifting of the baffle for filling the hopper with chaff.

Figure 3:
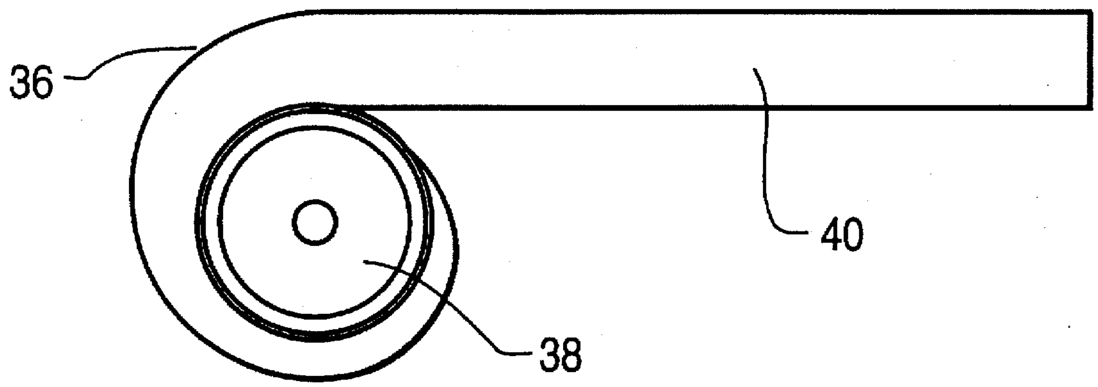
FIG. 3 shows a side perspective view of a blower useful for the invention.
Figure 4:
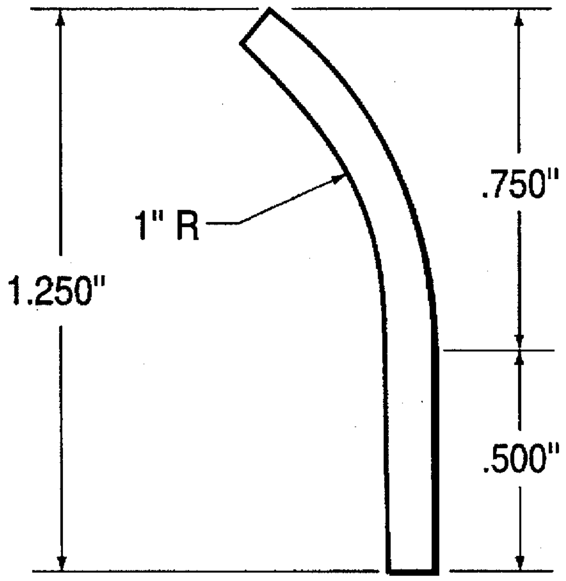
FIG. 4 hows a side view of a preferred fan blade segment in a blower useful for the invention.

An airflow control channel 28 extends along the curvature of the bottom and rear wall member and is positioned over the airholes 10 at the bottom thereof. The channel 28 provides means to adjust the amount of air flow through airholes 10. The channel is typically from about 0.5 to about 3 inches wide. The airflow control channel has a hinged door 30 at one end thereof to either allow or cut off air flow into the channel. At the bottom of the bottom and rear wall member is a plurality of airjets 32 which extend through the bottom portion of the bottom and rear wall member behind the dispensing chamber wall 22. The airjets comprise a series of nozzles and connected air hoses capable of directing a supply of forced air into the hopper. Suitable air pumping means, not shown, direct a supply of continuous or pulsed forced air through the airjets into the hopper. The fiber chaff dispenser further has a feed rate adjustment baffle which is attached at a hinge and spans the distance from the hinge to the dispensing chamber. This feed rate adjustment baffle controls the rate of chaff flow directed to the exit port 12. Attached about the exit port 12 is a blower 36 which is best seen in FIG. 3. The blower has a squirrel cage 38 into which chaff flows from the exit port. The squirrel cage is attached to a suitable motor which is well known in the art. The chaff is blown from the squirrel cage into a chute 40 for ultimate discharge therethrough. The squirrel cage is itself well known in the art and comprises a motorized fan having a plurality of fan blades. In one embodiment, the squirrel cage has a radius of from about 5 to about 6 inches, a blade separation of from about 1.25 to about 1.5 inches and a blade length of from about 5 to about 7 inches. In a preferred embodiment, the fan blades are partially curved with an exemplary width of from about 1 to about 1.5 inches. In another embodiment, the fan blade width has a straight bottom of about one-half inch where it is attached to the squirrel cage and then extends about another three quarters of an inch in width curved at a radius of curvature of about one inch as shown in FIG. 4.

In use, an operator, lifts baffle 24 via knob 27 to a position above the top opening 8 and fills the hopper with chaff fiber. The baffle then swings down along the bottom of the hopper and compresses the chaff behind wall 22. Initially, blower 36 is turned on and lid 14 is opened above the top 8 which allows airflow into the hopper and across the top surface of the chaff as controlled by feed rate adjustment baffle. The chaff-air mixture flows into dispensing chamber 20, through exit port 12, through squirrel cage 38 and out chute 40. If chaff output is insufficient, the hinged door 30 of airflow control channel 28 is opened, thus allowing additional airflow via the airholes 10 at the bottom of the bottom and rear wall member 2. Additional air then flows through these airholes 10, up from the bottom of the chaff mass and the chaff-air mixture flows through the feed rate adjustment baffle 34, into dispensing chamber 20, through exit port 12, through squirrel cage 38 and out chute 40. If airflow is still insufficient to move the chaff, pressurized air is dispensed through airjets 32 up from the bottom of the chaff mass and the chaff-air mixture flows through the feed rate adjustment baffle, into dispensing chamber 20, through exit port 12, through squirrel cage 38 and out chute 40. These additional airflow routes work together to achieve good tumbling of the chaff load. Since the airflow through the hopper is distributed, it serves to lift the load and, together with the airjets, provides a high velocity, low volume flow which ensures good tumbling and chaff distribution.

While this invention has been described with reference to the within preferred embodiment and drawings, it is not to be limited thereby, and the invention is to be construed in accordance with the appended claims.

What is claimed is:

1. A fiber chaff dispenser which comprises:

a.) a hopper capable of containing a mass of fiber chaff, the hopper comprising a single, continuous bottom and rear wall member whose cross section is generally an arc of a circle, and a front panel and two side panels attached to the bottom and rear wall member to form a substantially enclosed vessel having an open top; at least the bottom portion of the bottom and rear wall member having a plurality of airholes therethrough; the front panel having a single exit port for the fiber chaff;

b.) a hinged lid attached to said hopper and extending a distance sufficient to substantially completely cover the open top;

c.) means for lifting the lid a distance above the open top to thereby provide an airflow ingress to the hopper;

d.) a dispensing chamber comprising a wall interior to the hopper spaced from and substantially parallel to the plane of the front panel, said chamber extending from the bottom portion of the bottom of the exit port and extending to a point below the hopper top;

e.) baffle means inside the hopper spaced a distance behind the dispensing chamber, the baffle spanning the width of the hopper between each of the two side panels and extending the distance to the bottom and rear wall member;

f.) an airflow control channel extending along the curvature of the bottom and rear wall member and positioned over the airholes at the bottom portion thereof, said channel providing means to adjust the amount of air flow through said airholes;

g.) a plurality of airjets extending through the bottom portion of the bottom and rear wall member behind the dispensing chamber, said airjets being capable of directing a supply of forced air therethrough into the hopper; and h.) blower means attached to the exit port and capable of receiving fiber chaff from the dispensing chamber and blowing said chaff out through a chute.

2. The fiber chaff dispenser of claim 1 wherein the means for lifting the lid is adjustable cam means attached to at least one of the two side panels.

3. The fiber chaff dispenser of claim wherein the adjustable cam means is attached to each of the two side panels.

4. The fiber chaff dispenser of claim wherein the baffle means has a rubber edge at a place of contact with the bottom and rear wall member.

5. The fiber chaff dispenser of claim 1 wherein the airflow control channel comprises a hinged door at an end thereof.

6. The fiber chaff dispenser of claim further comprising means to direct a supply of forced air through the airjets into the hopper.

7. The fiber chaff dispenser of claim 1 further comprising a feed rate adjustment baffle attached at a hinge and spanning the distance from the hinge to the dispensing chamber.

8. The fiber chaff dispenser of claim further comprising a handle attached to the baffle means.

9. The fiber chaff dispenser of claim 1 wherein the baffle means has a plurality of airholes therethrough.

10. The fiber chaff dispenser of claim 1 further comprising means of directing a supply of pulsed forced air through the airjets.

11. A method of dispensing fiber chaff which comprises:

I. providing a chaff dispenser which comprises:

a.) a hopper capable of containing a mass of fiber chaff, the hopper comprising a single, continuous bottom and rear wall member whose cross section is generally an arc of a circle, and a front panel and two side panels attached to the bottom and rear wall member to form a substantially enclosed vessel having an open top; at least the bottom portion of the bottom and rear wall member having a plurality of airholes therethrough; the front panel having a single exit port for the fiber chaff;

b.) a hinged lid attached to said hopper and extending a distance sufficient to substantially completely cover the open top;

c.) means for lifting the lid a distance above the open top to thereby provide an airflow ingress to the hopper;

d.) a dispensing chamber comprising a wall interior to the hopper spaced from and substantially parallel to the plane of the front panel, said chamber extending from the bottom of the exit port and extending to a point below the hopper top;

e.) baffle means inside the hopper spaced a distance behind the dispensing chamber, the baffle spanning the width of the hopper between each of the two side panels and extending the distance to the bottom and rear wall member;

f.) an airflow control channel extending along the curvature of the bottom and rear wall member and positioned over the airholes at the bottom portion thereof, said channel providing means to adjust the amount of air flow through said airholes;

g.) a plurality of airjets extending through the bottom portion of the bottom and rear wall member behind the dispensing chamber, said airjets being capable of directing a supply of forced air therethrough into the hopper; and h.) blower means attached to the exit port and capable of receiving fiber chaff from the dispensing chamber and blowing said chaff out through a chute;

II. causing air to flow into said hopper from at least one of said airflow ingress, said plurality of airholes and said airjets; said air flow being sufficient to continuously lift fiber chaff in the hopper and supplying the chaff to the blower; and III. causing said blower to acquire the chaff from said hopper and expel said chaff out through a chute.

12. The method of claim 11 wherein the means for lifting the lid is adjustable cam means attached to at least one of the two side panels.

13. The method of claim 12 wherein the adjustable cam means is attached to each of the two side panels.

14. The method of claim 11 wherein the baffle means has a rubber edge at a place of contact with the bottom and rear wall member.

15. The method of claim 11 wherein the airflow control channel comprises a hinged door at an end thereof.

16. The method of claim 11 further comprising means to direct a supply of forced air through the airjets into the hopper.

17. The method of claim 11 further comprising a feed rate adjustment baffle attached at a hinge and spanning the distance from the hinge to the dispensing chamber.

18. The method of claim 11 further comprising a handle attached to the baffle means.

19. The method of claim 11 wherein the baffle means has a plurality of airholes therethrough.

20. The method of claim 11 further comprising directing a supply of pulsed forced air through the airjets.

* * * * *

UNITED STATES PATENT AND TRADEMARK OFFICE

CERTIFICATE OF CORRECTION

PATENT NO. : 5,671,869

DATED : September 30, 1997

INVENTOR(S) : Mark L.G. Althouse and Kevin J. Wilcock

It is certified that error appears in the above-identified patent and that said Letters Patent is hereby corrected as shown below:

In column 5, line 12, the claim reference numeral after "claim", should read --2--.

In column 5, lines 14, 19, and 25 the claim reference numeral, each occurrence after "claim", should read --1--.

Signed and Sealed this

Twentieth Day of January, 1998

Attest:

BRUCE LEHMAN

Attesting Officer

*Commissioner of Patents and Trademarks*